United States Patent [19]

Mercado

[11] Patent Number: 4,869,377
[45] Date of Patent: Sep. 26, 1989

[54] STORAGE RACK FOR LOAD LOCKS

[76] Inventor: David Mercado, P.O. Box 3841, Edinburg, Tex. 78540

[21] Appl. No.: 197,504

[22] Filed: May 23, 1988

[51] Int. Cl.$^4$ ............................................. A47F 5/08
[52] U.S. Cl. .................................... 211/89; 211/60.1; 211/4
[58] Field of Search ...................... 211/89, 8, 60.1, 64, 211/70.6, 70.5, 4

[56] References Cited

U.S. PATENT DOCUMENTS

| 2,002,566 | 5/1935 | Conigrave | 211/89 |
| 2,097,939 | 11/1937 | Timm | 211/64 X |
| 2,303,014 | 11/1942 | Williams | 211/89 |
| 2,581,824 | 1/1952 | Windahl | 211/89 X |
| 4,084,735 | 4/1978 | Kappas | 211/70.5 X |

Primary Examiner—Sarah A. Lechok
Attorney, Agent, or Firm—Gary C. Honeycutt

[57] ABSTRACT

Apparatus for the temporary storage of load locks to prevent accidental loss or theft during times when the load locks are not being used. The apparatus comprises a storage rack including a first swivel plate hinged upon a second swivel plate, which in turn is hinged upon a base plate to be mounted on an interior wall of a truck trailer. The apparatus further includes transverse support bars, first and second pairs of clamps, and a lock bar arranged to secure one pair of clamps in the closed position to prevent removal of the load locks.

4 Claims, 1 Drawing Sheet

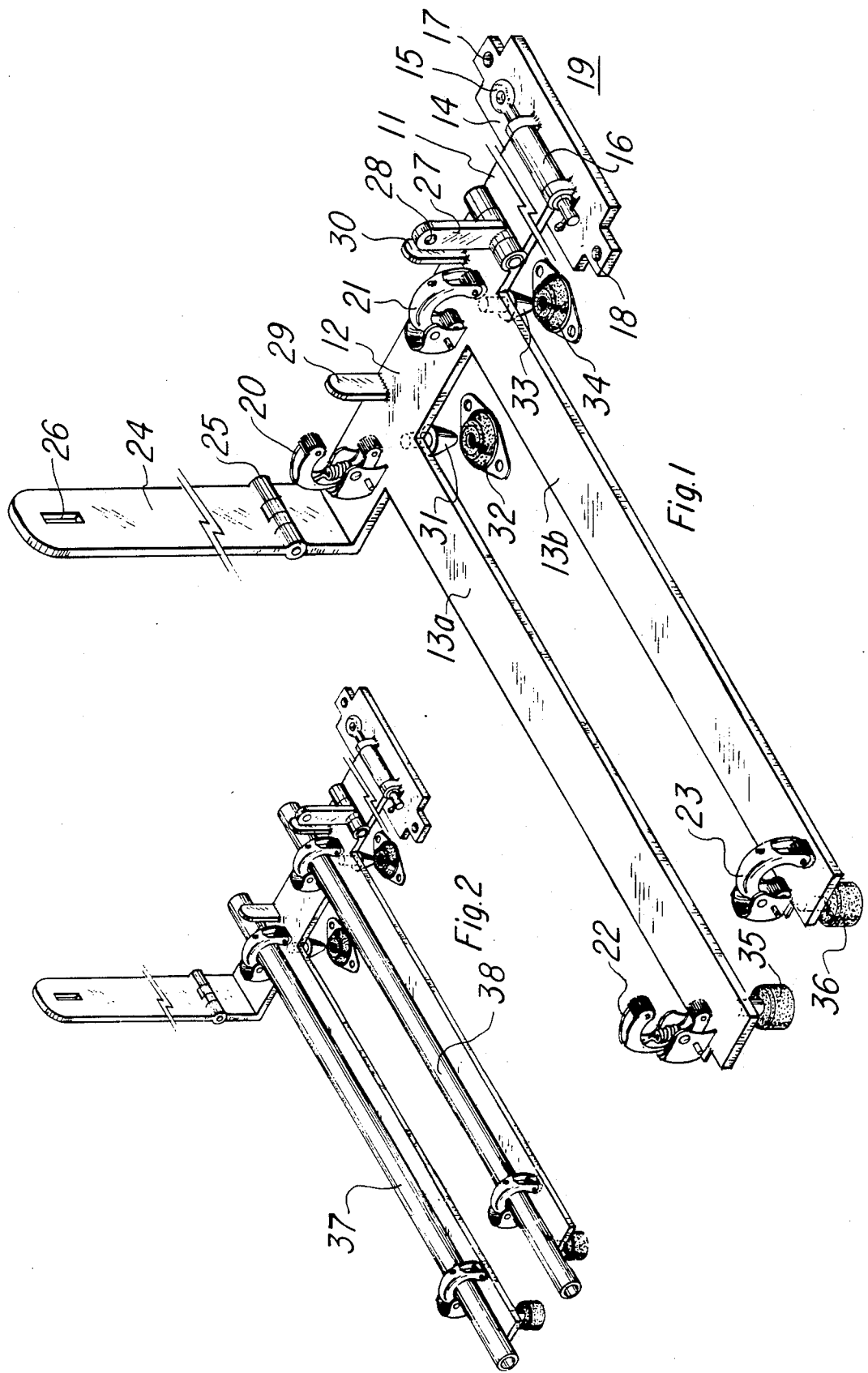

STORAGE RACK FOR LOAD LOCKS

This invention relates to the trucking industry, and more particularly to appratus for the temporary storage of load locks to prevent accidental loss or theft during times when the load locks are not being used.

Load locks generally consist of two or more elongated, sturdy metal rods or tubes designed to extend across the inside of a trailer from one wall to the other, and to lock in place by firmly engaging both trailer walls, so they will prevent any shifting of the load carried within the trailer.

A truck driver will usually remove the load locks at the end of a trip, and put them out of the way so that no one will trip over them while the trailer is being unloaded. Typically, the load locks will be left on the ground or leaned against a warehouse wall, where they lie unnoticed for most of the day or longer. Frequently the load locks are thus forgotten, especially if the driver leaves with an empty trailer, in which event the load locks may be lost or stolen.

Therefore, the driver needs a safe, convenient temporary storage means for making sure the load locks are not lost, while at the same time they are not allowed to interfere with the normal activities of the workers who unload the trailer. This invention provides a solution to the problem.

The invention is embodied in a storage rack comprising a base plate to be mounted on an inside wall of a trailer, preferably near the trailer door. The base plate includes means for supporting a first swivel plate, hinged thereon to swing in a plane substantially parallel to the trailer floor. The other end of the plate extends beyond the end of the trailer, when the door is open and the plate is swung fully in that direction.

A second swivel plate is hinged upon the first swivel plate, such that the second plate can be swung to the outside of the trailer, when the first swivel plate is fully extended to the rear of the trailer.

A number of elongated support bars are included on the second swivel plate, extending transversely therefrom. Each support bar is provided with a clamp for holding one of the load locks. The second swivel plate is also provided with a number of clamps, one for each support bar, aligned with the clamp on each support bar, such that each load lock will fit into an aligned pair of clamps.

The second swivel plate is provided with means for supporting a lock bar, at a position beyond the clamps on the second swivel plate. The lock bar is hinged upon the second swivel plate to swing in place so that it securely prevents all clamps on the swivel plate from opening, and thereby prevents removal of the load locks.

The lock bar has as opening that fits over a mating element that projects outwardly from the second swivel plate at or near its point of attachment to the first plate. The mating element also has an aperture for receiving a padlock or the like, to hold the lock bar in place.

FIG. 1 is a perspective view of the preferred embodiment of the invention.

FIG. 2 is also a perspective view of the same embodiment, showing the load locks in place.

The drawing shows a preferred embodiment of the invention. A first swivel plate 11, and a second switvel plate 12 including support bars 13a and 13b, are hinged to swing from base plate 14, secured thereto by hinge pin 15 which extends through hinge 16 formed in plate 11. Holes 17 and 18 are provided in the base plate so that it can be bolted to the inside of a trailer wall 19. Clamps 20 and 21 mounted on swivel plate 12 are spring loaded so that they remain open until the load locks are pressed against them, which causes them to close. Clamps 22 and 23 mounted on the other end of the support bars are aligned with clamps 20 and 21, respectively, to grip the load locks at a second position. Other types of clamps may be substituted for the ones shown.

Lock bar 24 is attached to plate 12 at hinge 25. It swings down to mate with bar 27, whereby clamps 20 and 21 are prevented from opening so that the load locks cannot be removed. A padlock is placed through hole 28 to hold bar 24 in place. The load locks have a "foot" at each end which prevents them from being slipped through the closed clamps.

Optional guide and support bars 29 and 30 may be provided to assist with the proper placement of the load locks into the storage rack. They can also serve to provide a "stop" for lock bar 24 in the closed position.

A cone-tipped plunger 31 is provided on the back of plate 12, aligned to fit into a resilient receptacle 32 for the purpose of releasably holding the assembly against the trailer wall. A second plunger 33 and receptacle 34 may be needed to ensure that the assembly remains in place. Receptacles 32 and 34 are fastened to the trailer wall.

Bumpers 35 and 36 may be provided in order to prevent bars 13a and 13b from vibrating against the wall.

FIG. 2 shows the storage rack of the invention, with load locks 37 and 38 stored in place and all clamps in the closed position. Each of the load locks has a foot portion at each end (not shown) that prevents removal by slipping them through closed clamps. Plate 11 is preferably about the same length as plate 12, but its length is not fully shown in the drawings, for drafting convenience.

The base plate and swivel plates are constructed of ¼-inch thick steel to provide optimum ruggedness and security, while the lock bar and support bars need not be so heavy. Each swivel plate is about one foot long for convenience, but other dimensions and other materials may be substituted without departing from the concept of the invention.

What is claimed is:

1. A storage rack for load locks comprising:
   (a) a base plate to be mounted on a wall;
   (b) a first swivel plate hinged upon said base plate;
   (c) a second swivel plate hinged upon said first swivel plate;
   (d) a pair of elongated support bars mounted on said second swivel plate and extending transversely therefrom;
   (e) a first pair of clamps mounted on said second swivel plate, adapted to hold said load locks;
   (f) a second pair of clamps mounted on said support bars, also adapted to hold said load locks; and
   (g) a lock bar hinged on said second swivel plate in a position to securely prevent said first pair of clamps from opening, and thereby prevent removal of said load locks.

2. A storage rack as in claim 1 wherein said swivel plates and lock bar are hinged to swing in substantially a single plane.

3. A storage rack as in claim 1 wherein said clamps are spring loaded to remain open when not in use, and to close when the load locks are pressed into place.

4. A storage rack as in claim 1 further including means for holding said swivel plates against the wall whereon said base plate is mounted.

* * * * *